US011934264B2

United States Patent
Zamir et al.

(10) Patent No.: US 11,934,264 B2
(45) Date of Patent: Mar. 19, 2024

(54) ECC PARITY BIASING FOR KEY-VALUE DATA STORAGE DEVICES

(71) Applicant: Western Digital Technologies, Inc., San Jose, CA (US)

(72) Inventors: Ran Zamir, Ramat Gan (IL); David Avraham, Even Yehuda (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/531,975

(22) Filed: Nov. 22, 2021

(65) Prior Publication Data
US 2023/0161666 A1 May 25, 2023

(51) Int. Cl.
*G06F 11/10* (2006.01)
*G06F 3/06* (2006.01)

(52) U.S. Cl.
CPC ........ *G06F 11/1068* (2013.01); *G06F 3/0619* (2013.01); *G06F 3/0631* (2013.01); *G06F 3/0659* (2013.01); *G06F 3/0673* (2013.01); *G06F 11/1004* (2013.01)

(58) Field of Classification Search
CPC . G11C 16/26; G11C 16/3427; G11C 16/0483; G11C 16/0475; G11C 29/52; G11C 11/5642; G11C 2211/5644; G11C 2211/5648; G06F 3/0619; G06F 3/064; G06F 3/0659; G06F 3/0679; G06F 11/1072; G06F 11/1068; H03M 13/152
See application file for complete search history.

(56) References Cited

U.S. PATENT DOCUMENTS

| 8,266,367 | B2 | 9/2012 | Yu et al. |
| 8,412,879 | B2 | 4/2013 | Chang et al. |
| 10,846,174 | B2 | 11/2020 | Lee et al. |
| 10,871,910 | B1 | 12/2020 | Alrod et al. |
| 10,956,071 | B2 | 3/2021 | Subbarao |
| 11,340,986 | B1 | 5/2022 | Yadav et al. |
| 2003/0043749 | A1* | 3/2003 | Tanaka ............... H04L 1/007 714/799 |
| 2007/0271493 | A1* | 11/2007 | Oh .................... H04L 1/007 714/755 |

(Continued)

FOREIGN PATENT DOCUMENTS

WO 2005036390 A2 4/2005

OTHER PUBLICATIONS

Jin, Yanqin et al. "KAML: A Flexible, High-Performance Key-Value SSD," IEEE International Symposium on High Performance Computer Architecture 2017 (12 pages).

*Primary Examiner* — Guy J Lamarre
(74) *Attorney, Agent, or Firm* — Michael Best & Friedrich LLP

(57) ABSTRACT

Error correction code (ECC) coding for key-value data storage devices. In one embodiment, a controller includes a memory interface configured to interface with a memory; an ECC engine configured to perform ECC coding on data stored in memory; a controller memory including a flash translation layer and a namespace database; and an electronic processor. The electronic processor is configured to receive data to be stored, separate the data into a plurality of sub-code blocks, and allocate parity bits to each sub-code block of the plurality of sub-code blocks.

19 Claims, 8 Drawing Sheets

(56) References Cited

U.S. PATENT DOCUMENTS

| | | | |
|---|---|---|---|
| 2010/0241929 A1* | 9/2010 | Song | H03M 13/2906 |
| | | | 714/763 |
| 2014/0153654 A1* | 6/2014 | Vojcic | H04N 21/4382 |
| | | | 375/240.28 |
| 2017/0255519 A1 | 9/2017 | Zhang et al. | |
| 2017/0344284 A1 | 11/2017 | Choi et al. | |
| 2018/0293174 A1 | 10/2018 | Song et al. | |
| 2018/0358989 A1* | 12/2018 | Mehra | H03M 13/2918 |
| 2019/0004964 A1 | 1/2019 | Kanno | |
| 2020/0042223 A1 | 2/2020 | Li | |
| 2020/0174695 A1 | 6/2020 | Bazarsky et al. | |
| 2021/0109677 A1* | 4/2021 | Das | G06F 12/0246 |
| 2021/0174224 A1 | 6/2021 | Sharon et al. | |
| 2021/0216220 A1* | 7/2021 | Kim | G06F 3/0656 |
| 2022/0147440 A1* | 5/2022 | Benisty | G06F 12/0868 |
| 2022/0155965 A1 | 5/2022 | Smith et al. | |
| 2022/0179593 A1 | 6/2022 | Benisty | |
| 2022/0359033 A1* | 11/2022 | Iwasaki | G11C 29/42 |
| 2023/0133361 A1 | 5/2023 | Shilane et al. | |

\* cited by examiner

ECC PARITY BIASING FOR KEY-VALUE DATA STORAGE DEVICES

BACKGROUND

This application relates generally to data storage devices and, more particularly, to error correction code (ECC) coding in data storage devices.

A Key-Value (KV) database stores a quantity of user data that is associated with a key that is addressable as complete entity. For example, the user data may be a photo, a record, or a file. From the host's point-of-view, the photo or the file may be retrieved using a single key/read address rather than multiple read addresses containing the data that makes up the photo. The use of a single key/read address simplifies database management for certain applications, which results in performance increases in these applications.

SUMMARY

The techniques of the present disclosure improve the operation of the KV database described above. Specifically, the KV data storage device of the present disclosure takes advantage of the unique structure of the KV database that each value is written entirely and in order and that each value must be read entirely, or up to some point, but not read from an index. As described in greater detail below, the KV data storage device of the present disclosure takes advantage of this unique structure to provide better performance, reduced latency, reduced power consumption, and better correction capability, reliability, and endurance of the KV data storage device.

The first advantage of supporting a KV database on the storage device level is the increase in the performance in terms of transfers/second. This advantage occurs for two reasons: 1) the translation layer in the host from key/value to block storage may be removed or is rendered unnecessary, and 2) the removal of the translation layer removes two layers of mapping and transaction information, which increases the amount of transactions per second, reduces the write amplification, and reduces latency because the commands over the bus are reduced to a single transfer for the entire key value pair.

A second advantage of the KV data storage device of the present disclosure is the simplification and enablement of computational storage (near storage compute). The user data on the KV data storage device is now identifiable as a complete unit as opposed to various pieces that may or may not be contiguous in a normal storage operation.

The disclosure provides a data storage controller including, in one embodiment, a memory interface, an error correction code (ECC) engine, a controller memory, and an electronic processor communicatively connected to the ECC engine and the controller memory. The memory interface is configured to interface with a memory. The error correction code (ECC) engine is configured to perform ECC coding on data stored in the memory. The controller memory includes a flash translation layer (FTL) and a namespace database. The electronic processor, when executing the FTL, is configured to receive data to be stored, separate the data into a plurality of sub-code blocks, and allocate parity bits generated by the ECC engine to each sub-code block.

The disclosure also provides a method. In one embodiment, the method includes receiving, with an electronic processor of a data storage controller, data to be stored in a key-value (KV) database, separating the data into a plurality of sub-code blocks, and allocating parity bits to each sub-code block of the plurality of sub-code blocks.

The disclosure also provides a memory device that supports storing data in a key value namespace. The memory device includes a memory and a controller. The memory includes a key-value (KV) database. The controller is configured to perform a first ECC coding process that allocates parity into user data when writing the user data to the KV database.

In this manner, various aspects of the disclosure provide for improvements in at least the technical fields of data storage devices and their design and architecture. The disclosure can be embodied in various forms, including hardware or circuits controlled by firmware code executing on a processor), and computer systems and networks; as well as hardware-implemented methods, signal processing circuits, memory arrays, application specific integrated circuits, field programmable gate arrays, and the like. The foregoing summary is intended solely to give a general idea of various aspects of the disclosure, and does not limit the scope of the disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the memory device may be performed by hardware (e.g., analog or digital circuits), a combination of hardware and software (e.g., program code or firmware, stored in a non-transitory computer-readable medium, that is executed by processing or control circuitry), or any other suitable means. The following description is intended solely to give a general idea of various aspects of the disclosure, and does not limit the scope of the disclosure in any way.

Figure 1:
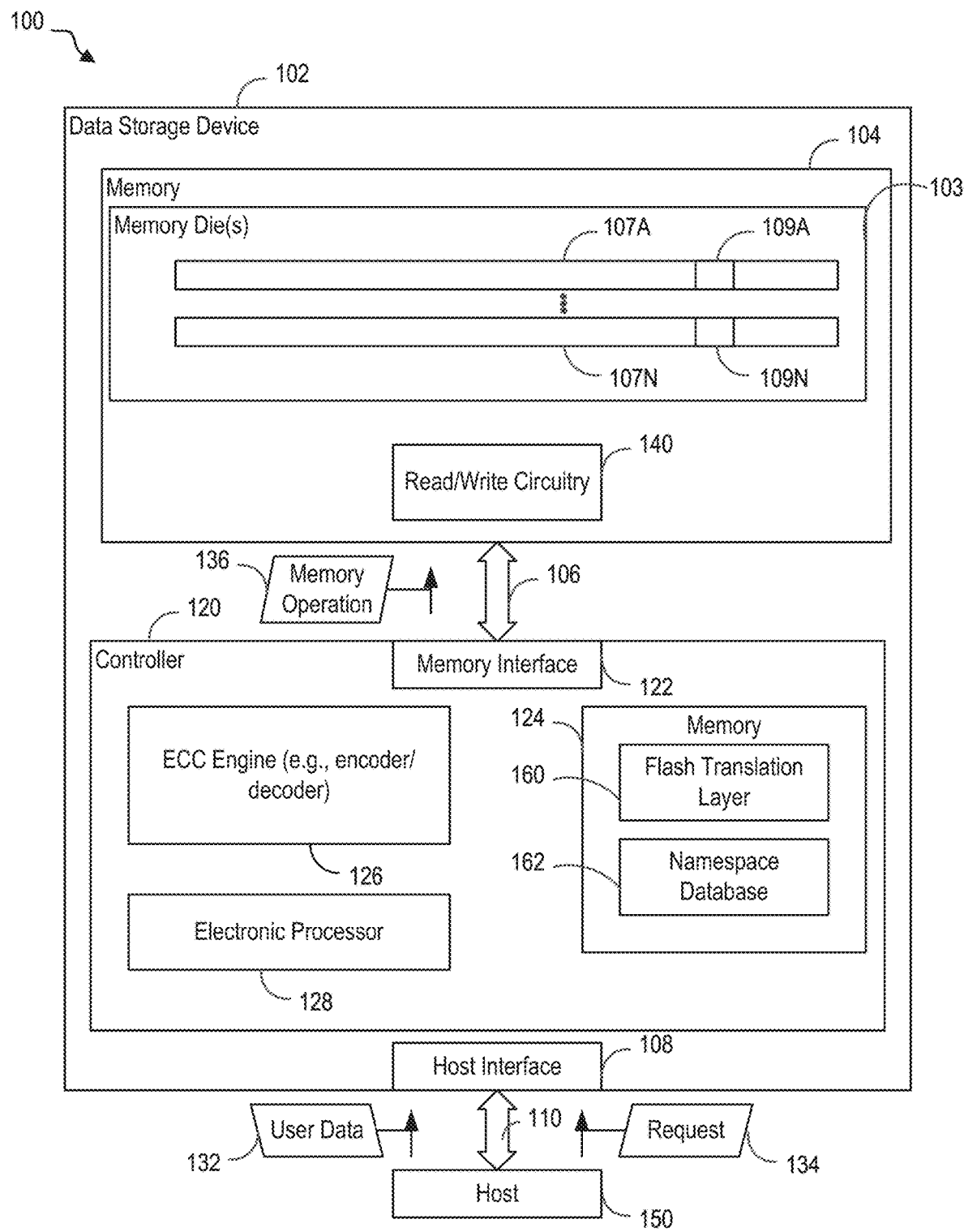
FIG. 1 is block diagram of a system including a data storage device with ECC coding/decoding, in accordance with some embodiments of the disclosure.

FIG. 1 is block diagram of a system 100 including a data storage device 102 with ECC coding/decoding, in accordance with some embodiments of the disclosure. In the example of FIG. 1, the system 100 includes the data storage device 102 and a host device 150 (also referred to as "external electronic device"). The data storage device 102 includes a controller 120 and a memory 104 (e.g., non-volatile memory) that is coupled to the controller 120.

One example of the structural and functional features provided by the controller 120 are illustrated in FIG. 1. However, the controller 120 is not limited to the structural and functional features provided by the controller 120 in FIG. 1. The controller 120 may include fewer or additional structural and functional features that are not illustrated in FIG. 1.

The data storage device 102 and the host device 150 may be operationally coupled with a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 150 with the communication path 110, such as a wired communication path and/or a wireless communication path. For example, the data storage device 102 may include an interface 108 (e.g., a host interface) that enables communication with the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as one or more requests 134 to erase data at, read data from, or write data to the memory 104 of the data storage device 102. For example, the one or more requests 134 may include a key-value (KV) or read address associated with user data 132, where the user data 132 is an entire photo, entire record, or an entire file. Additionally, the host device 150 may be configured to provide data, such as the user data 132, to be stored at the memory 104 or to request data to be read from the memory 104. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

The host device 150 communicates with a memory interface that enables reading from the memory 104 and writing to the memory 104. In some examples, the host device 150 may operate in compliance with an industry specification, such as a Universal Flash Storage (UFS) Host Controller Interface specification. In other examples, the host device 150 may operate in compliance with one or more other specifications, such as a Secure Digital (SD) Host Controller specification or other suitable industry specification. The host device 150 may also communicate with the memory 104 in accordance with any other suitable communication protocol.

The memory 104 of the data storage device 102 may include a non-volatile memory (e.g., NAND, BiCS family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. Each of the one or more memory dies 103 may include one or more blocks (e.g., one or more erase blocks). Each block may include one or more groups of storage elements, such as a representative group of storage elements 107A-107N. The group of storage elements 107A-107N may be configured as a word line. The group of storage elements 107A-107N may include multiple storage elements memory cells that are referred to herein as a "string"), such as a representative storage elements 109A and 109N, respectively.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies.

The data storage device 102 includes the controller 120 coupled to the memory 104 (e.g., the one or more memory dies 103) with a bus 106 and a memory interface 122 (e.g., interface circuitry), another structure, or a combination thereof. For example, the bus 106 may include multiple distinct channels to enable the controller 120 to communicate with each of the one or more memory dies 103 in parallel with, and independently of, communication with the other memory dies 103. In some implementations, the memory 104 may be a flash memory.

The controller 120 is configured to receive data and instructions from the host device 150 and to send data to the host device 150 with the memory interface 122. For example, the controller 120 may send data to the host device 150 with the interface 108, and the controller 120 may receive data from the host device 150 with the interface 108.

The controller 120 is configured to send data and commands (e.g., the memory operation 136) to the memory 104 with the memory interface 122. For example, the controller 120 is configured to send data and a write command to cause the memory 104 to store data to a specified address of the memory 104 with the memory interface 122. The write command may specify a physical address of a portion of the memory 104 (e.g., a physical address of a word line of the memory 104) that is to store the data.

The controller 120 is configured to send a read command to the memory 104 to access data from a specified address of the memory 104 with the memory interface 122. The read command may specify the physical address of a region of the memory 104 (e.g., a physical address of a word line of the memory 104). The controller 120 may also be configured to send data and commands to the memory 104 associated with background scanning operations, garbage collection operations, and/or wear-leveling operations, or other suitable memory operations with the memory interface 122.

The controller 120 may include a memory 124, an error correction code (ECC) engine 126, and the processor 128. The memory 124 may be configured to store data and/or instructions that may be executable by the processor 128. The memory 124 may include flash translation layer 160 and a namespace database 162. The flash translation layer 160 may be a hardware circuit or instructions that are executable by the processor 128. The flash translation layer 160 may cause the processor 128 to set up namespaces (i.e., Key-Value (KV) namespaces and Block IO namespaces) in the namespace database 162 that are associated with different physical regions of the memory 104. In some examples, the host device 150 includes a command in the request 134 to cause the processor 128 to set up namespaces including KV namespaces and block 10 namespaces. In other examples, the flash translation layer 160 may cause the processor 128 to set up namespaces including KV namespaces and block 10 namespaces in response to receiving keys in the request 134 from the host device 150.

The KV namespaces represent a KV database in the data storage device 102 and each KV namespace includes a key associated with an amount of data across a plurality of addresses and the data is indexed according to this key. In some examples, each KV namespace may also include multiple key value pairs. Each Block 10 namespace includes a logical address range and the host device 150 may access any address in the logical address range.

The flash translation layer 160 may also select or generate one of the KV namespaces or the Block 10 namespaces based on one of the request 134 and a size the user data 132. For example, when the request 134 includes a key and the size of the user data 132 is equal to or above a threshold (e.g., 4 KB), the flash translation layer 160 generates (when the key is new) or selects (when the key has been previously seen) one of the KV namespaces that is associated with the key. Alternatively, when the request 134 includes a key and the size of the user data 132 is below a threshold (e.g., 4 KB), the flash translation layer 160 generates (when the key is new) or selects (when the key has been previously seen) one of the Block 10 namespaces that is associated with the key and a single address. Further, when the request 134 includes a single address, the flash translation layer 160 generates (when the address is new) or selects (when the address has been previously seen) one of the Block JO namespaces that is associated with the address. In other examples, the request 134 also requests the user data 132 to be saved to a Block IO namespace or a KV namespace.

Upon generating or selecting one of the KV namespaces or the Block 10 namespaces, the flash translation layer 160 may control the FCC engine 126 to perform FCC coding/decoding with the memory operation 136 and the memory interface 122, and based on the selected namespace and the user data 132. In some examples, the FCC engine 126 may perform asymmetrical ECC coding/decoding with the memory operation 136 based on a selection of a key-value (KV) namespace that is referred to herein as "asymmetric ECC coding/decoding" and is described in greater detail below with respect to FIGS. 3-8. Additionally, in these examples, the ECC engine 126 may also perform FCC coding/decoding using Spatially-Coupled Low Density Parity Check (SC-LDPC) code with the memory operation 136 based on a selection of a KV namespace that is referred to herein as "SC-LDPC asymmetric ECC coding/decoding" and is described in greater detail below with respect to FIGS. 5-8. Further, in some examples, an application or circuitry separate and distinct from any application stored in the memory 124 may control the FCC engine 126 to perform asymmetric ECC coding/decoding or SC-LDPC asymmetric ECC coding/decoding as described herein.

The retrieve command of a KV database in the data storage device 102 requires that values are read from the beginning and entirely up to some point, and are not read based on an index. Methods described herein use the unique structure of the KV database retrieve command to provide better performance, latency, power consumption, and correction capability of the data storage device 102.

Figure 2:
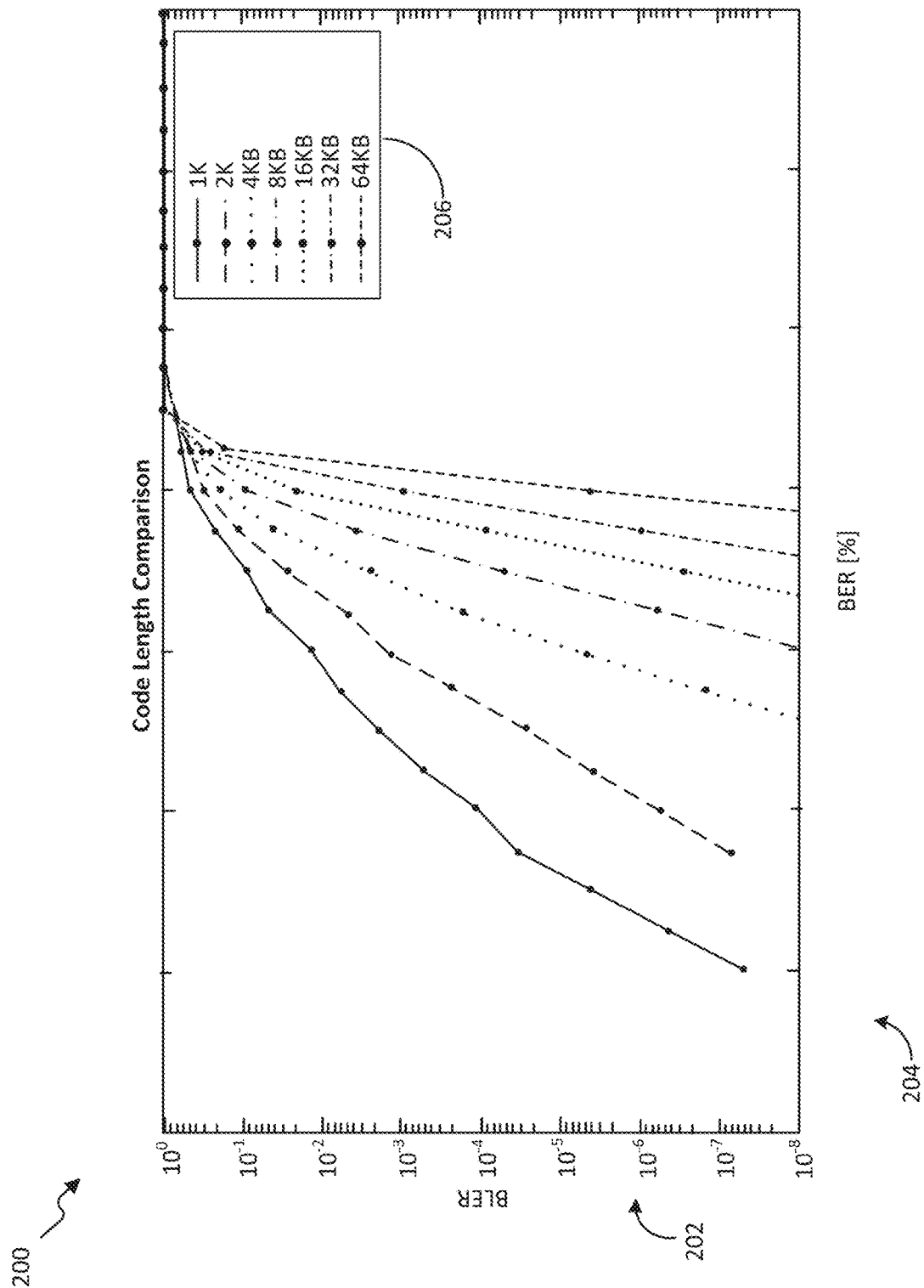
FIG. 2 is a graph illustrating the correction capability of example LDPC codes of different lengths, in accordance with some embodiments of the disclosure.

Longer ECCs perform better and result in less decoding failures than short ECCs. For example, FIG. 2 is a graph 200 illustrating an example of various ECC lengths for X4 memory dies. The y-axis 202 of the graph 200 provides the Block Error Rate (BLER) of each code length defined by the legend 206. The x-axis 204 of the graph 200 provides the Bit Error Rate (BER) of each code length defined by the legend 206. As seen, longer ECCs have a greater correction capability than shorter ECCs.

Figure 3:
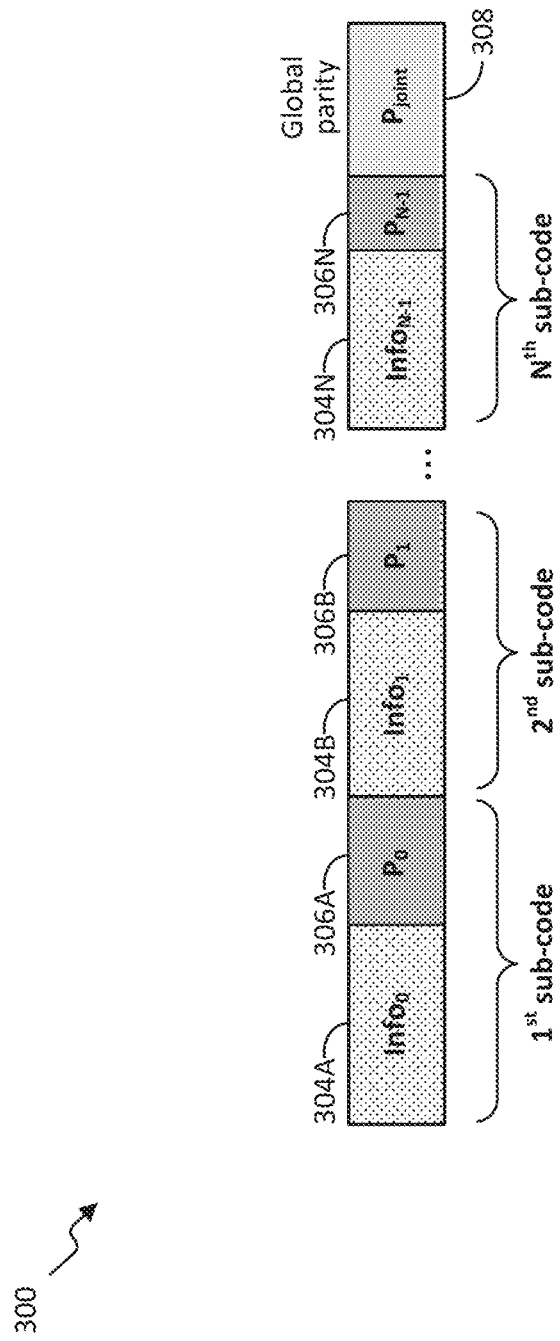
FIG. 3 is a diagram illustrating a code word with asymmetric parity allocation, in accordance with some embodiments of the disclosure.

FIG. 3 provides an example of asymmetrically allocating code parity between sub-codes of a code block 300. A sub-code structure is, for example, a code structure where smaller sections of the data have local parity bits that can be used to locally decode them (e.g., without the data of other sub-codes). Additionally, there may be joint parity bits connecting several sub-codes together such that the sub-codes may also be decoded jointly as a longer code for better correction capability. The code block 300 includes a plurality of sub-codes 302 (such as first sub-code 302A, second sub-code 302B, ranging down to final sub-code 302N), The code block 300 may have any number of sub-codes 302. Each sub-code includes a data block 304 and a parity block 306. For example, the first sub-code 302A has a first data block 304A and a first parity block 306A, the second sub-code 302B has a second data block 304B and a second parity block 306B, and the final sub-code 302N has a final data block 304N and a final parity block 306N. Additionally, the code block 300 includes a global parity block 308 following the final parity block 306N.

In some examples, parity is distributed evenly among each sub-code. For example, the first sub-code 302A, the second sub-code 302B, and the final sub-code 302N are each allocated an equal amount of parity. In other examples, more parity is allocated to earlier sub-codes, such as first sub-code 302A, than sub-codes that come later, such as the second sub-code 302B and the final sub-code 302N. Parity allocation may linearly decrease as parity is allocated to each sub-code 302. In other examples, the decrease in parity may be non-linear, such that the first parity block 306A and the second parity block 306B have an equal number of parity bits (e.g., N parity bits), and subsequent parity blocks 306 have less parity bits (e.g., 0.75N parity bits). Accordingly, the first parity block 306A is larger (i.e., includes more parity bits) than or equal to (i.e., includes the same number of parity bits) the second parity block 306B, and the second parity block 306B is larger than the final parity block 306N. As codes in a KV database are read serially, sub-codes 302 at the beginning (such as the first sub-code 302A) may be read by themselves, and therefore may be decoded without subsequent sub-codes 302, resulting in a shorter length. Additionally, subsequent sub-codes are always read after previous codes, so the previous sub-codes can be used and have a longer code length. Therefore, subsequent sub-codes need less parity for the same amount of correction. Accordingly, as the overall parity to be allocated is limited, more parity is allocated to early sub-codes 302 to increase their correctability.

Figure 4:
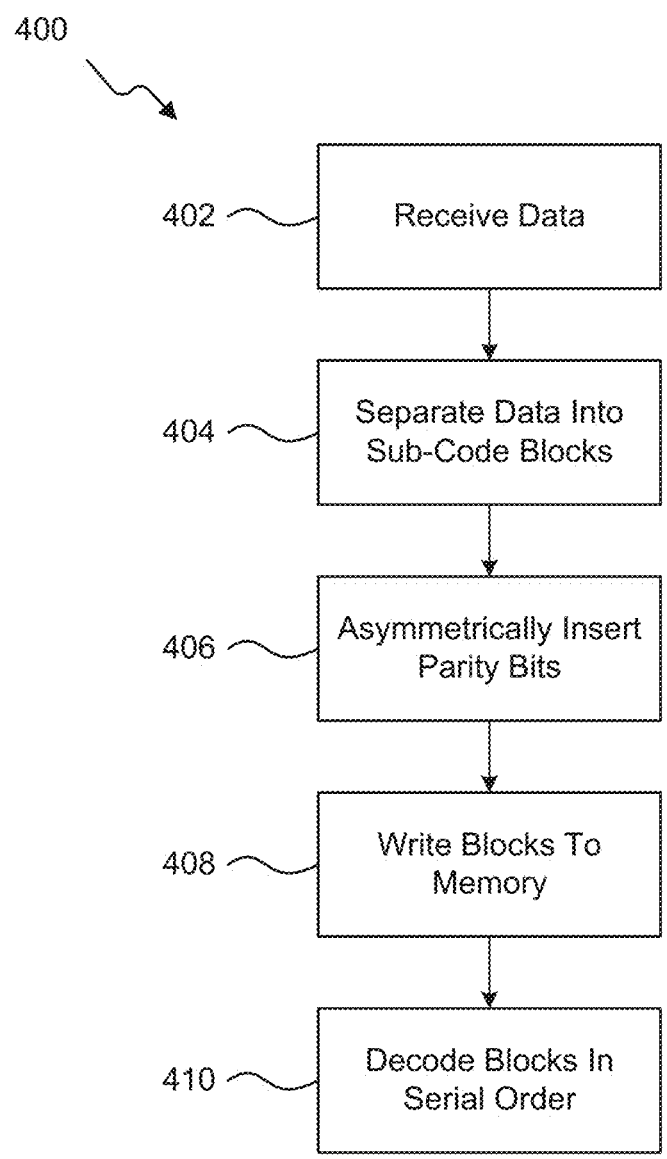
FIG. 4 is flowchart illustrating an asymmetric parity allocation process, in accordance with some embodiments of the disclosure.

FIG. 4 is a flowchart illustrating an asymmetric parity allocation process 400 (i.e., the asymmetric ECC coding/decoding), in accordance with various aspects of the present disclosure. FIG. 4 is described with respect to the controller 120 of FIG. 1.

As illustrated in FIG. 4, the asymmetric parity allocation process 400 includes the controller 120 receiving data to be stored in the memory 104 (at block 402). The data may be, for example, the user data 132. The asymmetric parity allocation process 400 includes the controller 120 separating the data into sub-code blocks, such as the sub-code blocks 302 (at block 404).

The asymmetric parity allocation process 400 includes the controller 120 asymmetrically inserting parity bits between sub-code blocks. For example, the first parity block 306A is added to (i.e., allocated to) the first sub-code 302A, the second parity block 306B is added to the second sub-code 302B, and the final parity block 306N is added to the final sub-code 302N. In some examples, the global parity block 308 is added to the data.

The asymmetric parity allocation process 400 includes the controller 120 writing the sub-code blocks to the memory 104. In some examples, the controller 120 writes the sub-code blocks to the memory 124. In other examples, the controller 120 writes the sub-code blocks to the memory of the host device 150. The asymmetric parity allocation process 400 includes the controller 120 decoding the sub-code blocks in sequential order (e.g., a serial order, first/last order, or other sequential order). In some examples, only the first sub-code 302A, including the first data block 304A and the first parity block 306A, is decoded by the controller 120. In other examples, both the first sub-code 302A and the second sub-code 302B, including the second data block 304B and the second parity block 306B, are decoded. In some examples, the entire code block 300 is decoded.

Figure 5:
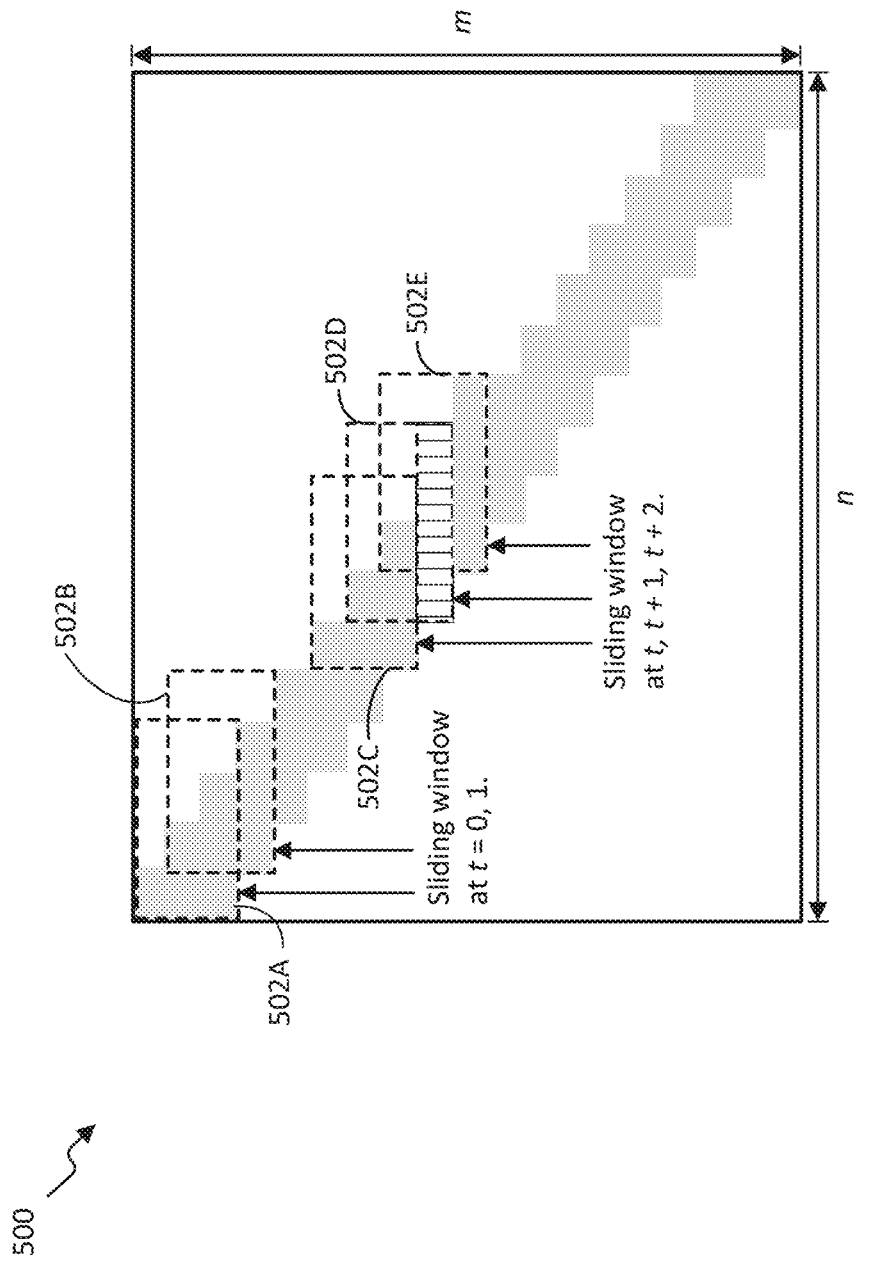
FIG. 5 is a diagram illustrating an example parity check matrix with a spatially-coupled LDPC structure, in accordance with some embodiments of the disclosure.

Asymmetric parity allocation may also be implemented using SC-LDDC code. SC-LDPC code is composed of tiles. FIG. 5 provides an example SC-LDDC parity check matrix structure 500, in accordance with various aspects of the present disclosure. The SC-LDPC parity check matrix structure 500 includes a plurality of tiles 502, such as first tile 502A, second tile 502B, third tile 502C, fourth tile 502D, and fifth tile 502E. Parity is allocated to each tile 502 unevenly. Specifically, more parity (e.g., more rows in the parity check matrix) is allocated to the tiles at the beginning and less parity is allocated to the tiles towards the end of the SC-LDPC parity check matrix structure 500. For example, the first tile 502A receives the most parity, and the fifth tile 502E receives the least parity.

Figure 6:
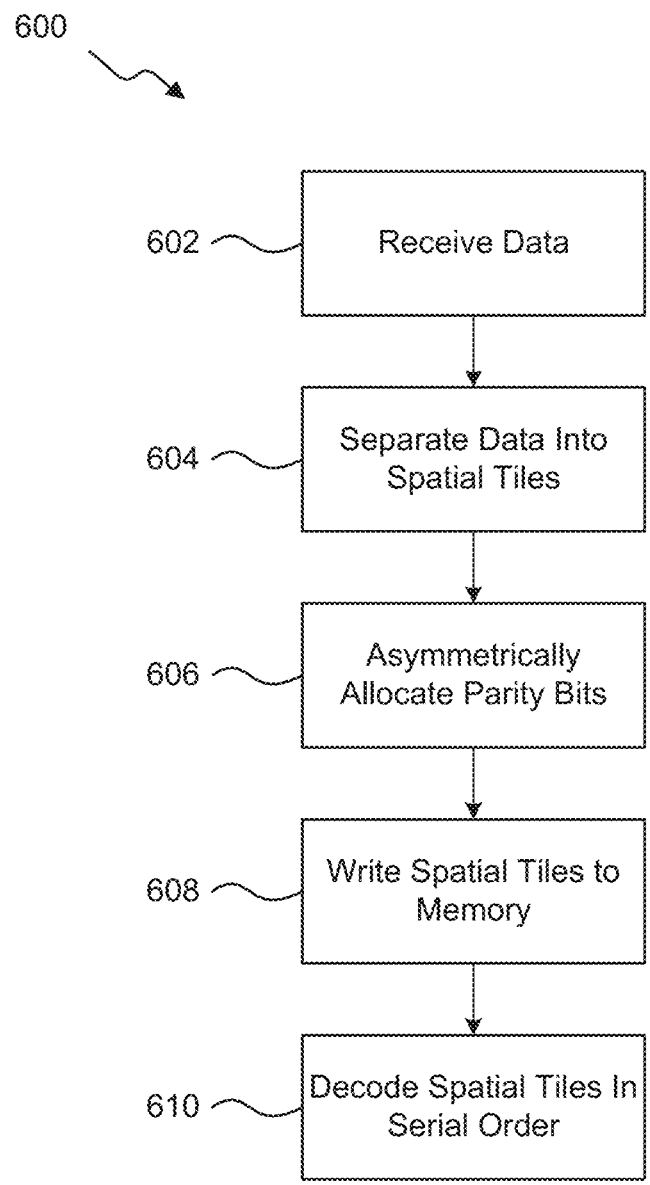
FIG. 6 is a flowchart illustrating another asymmetric parity allocation process, in accordance with some embodiments of the disclosure.

FIG. 6 is a flowchart illustrating an asymmetric parity allocation process 600 (i.e., the SC-LDPC asymmetric ECC coding/decoding), in accordance with various aspects of the present disclosure. FIG. 6 is described with respect to the controller 120 of FIG. 1.

As illustrated in FIG. 6, the asymmetric parity allocation process 600 includes the controller 120 receiving data to be stored in the memory 104 (at block 602). The data may be, for example, the user data 132. The asymmetric parity allocation process includes the controller 120 separating the data into spatial tiles, such as the plurality of tiles 502 (at block 604).

The asymmetric parity allocation process 600 includes the controller 120 asymmetrically allocating parity bits to each of the plurality of spatial tiles 502 (at block 606). The asymmetric parity allocation process 600 includes the controller 120 writing the plurality of spatial tiles 502 to the memory 104 (at block 608). In some examples, each of the plurality of spatial tiles 502 are written to the memory 104 in sequential order (e.g., a serial order, first/last order, or other sequential order). For example, the first tile 502A is written to memory 104 first, the second tile 502B is written to the memory 104 second, and the like. In some examples, the controller 120 writes the plurality of spatial tiles 502 to the memory 124. In other examples, the controller 120 writes the plurality of spatial tiles 502 to the memory of the host device 150. The asymmetric parity allocation process 600 includes the controller 120 decoding the plurality of spatial tiles 502 in sequential order (at block 610), In some examples, the tiles are decoded in a sliding window process.

Figure 7:
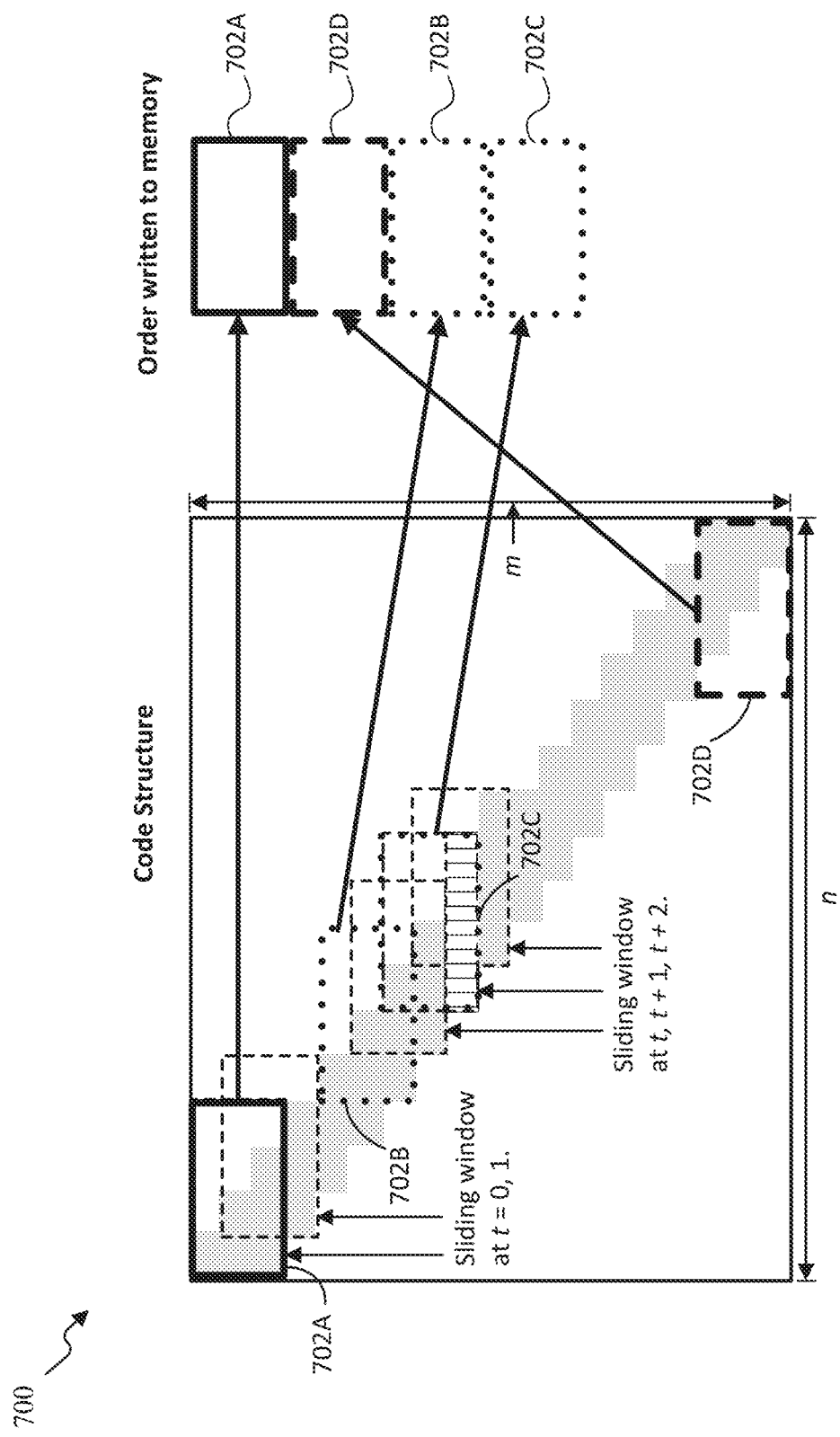
FIG. 7 is a diagram illustrating an alternative example spatially-coupled LDPC structure, in accordance with some embodiments of the disclosure.

FIG. 7 illustrates another example SC-LDPC parity check matrix structure 700, in accordance with various aspects of the present disclosure. The SC-LDPC parity check matrix structure 700 includes a plurality of tiles 702, such as first tile 702A, second tile 702B, third tile 702C, and fourth tile 702D. Parity is allocated to each tile 702 unevenly. The first and last tiles in an SC-LDPC code inherently have more parity and may be stored in the memory 104 first. In the example of FIG. 7, the first tile 702A and the fourth tile 702D include more parity than the second tile 702B and the third tile 702C. As the first tile 702A and the fourth tile 702D include more parity, they are written to the memory 104 first.

Figure 8:
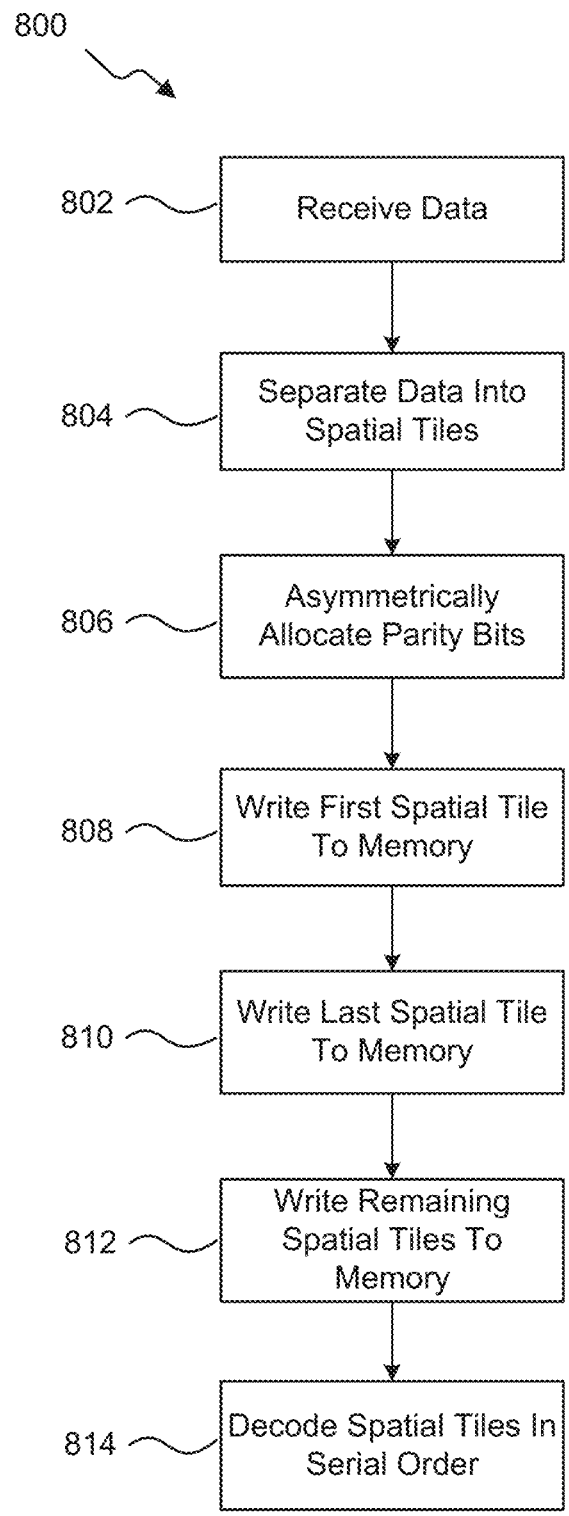
FIG. 8 is a flowchart illustrating another asymmetric parity allocation process, in accordance with some embodiments of the disclosure.

FIG. 8 is a flowchart illustrating an asymmetric parity allocation process 800, in accordance with various aspects of the present disclosure. FIG. 8 is described with respect to the controller 120 of FIG. 1.

As illustrated in FIG. 8, the asymmetric parity allocation process 800 includes the controller 120 receiving data to be stored in the memory 104 (at block 802). The data may be, for example, the user data 132. The asymmetric parity allocation process includes the controller 120 separating the data into spatial tiles, such as the plurality of tiles 702 (at block 804).

The asymmetric parity allocation process 800 includes the controller 120 asymmetrically allocating parity bits to each of the plurality of spatial tiles 702 (at block 806). The asymmetric parity allocation process 800 includes the controller 120 writing the first spatial tile (i.e., first tile 702A) to the memory 104 (at block 808). The asymmetric parity allocation process 800 includes the controller 120 writing the last spatial tile (i.e., fourth tile 702D) to the memory 104 (at block 810). As stated above, the first and last spatial tiles in a SC-LDPC parity check matrix structure 500, 700 inherently has more parity. By storing the last spatial tile immediately after the first spatial tile, more parity is allocated at the beginning of the stored memory block.

The asymmetric parity allocation process 800 includes the controller 120 writing the remaining spatial tiles 702 to the memory 104 (at block 812). In some examples, the controller 120 writes the plurality of spatial tiles 702 to the memory 124. In other examples, the controller 120 writes the plurality of spatial tiles 702 to the memory of the host device 150. In some examples, each of the remaining spatial tiles 702 are written to the memory 104 in sequential order (e.g., a serial order, first/last order, or other sequential order). For example, following the fourth tile 702D, the controller 120 writes the second tile 702B to the memory 104, followed by the third tile 702O. The asymmetric parity allocation process 800 includes the controller 120 decoding the plurality of spatial tiles 702 in sequential order as written to the memory 104 (at block 814). In some examples, the tiles are decoded in a sliding window process.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage controller, comprising:
    a memory interface configured to interface with a memory;
    an error correction code (ECC) engine configured to perform ECC coding on data stored in the memory;
    a controller memory including a flash translation layer (FTL) and a key-value (KV) database; and
    an electronic processor communicatively connected to the ECC engine and the controller memory, the electronic processor, when executing the FTL, is configured to:
        receive data to be stored in the KV database,
        separate the data into a plurality of sub-code blocks, and
        allocate parity bits generated by the ECC engine to each sub-code block of the plurality of sub-code blocks.

2. The data storage controller of claim 1, wherein the parity bits are asymmetrically allocated to each sub-code block of the plurality of sub-code blocks.

3. The data storage controller of claim 2, wherein a first sub-code block of the plurality of sub-code blocks receives more parity bits than a last sub-code block of the plurality of sub-code blocks.

4. The data storage controller of claim 1, wherein the electronic processor, when executing the FTL, is further configured to:
    write, after allocating the parity bits to each sub-code block of the plurality of sub-code blocks, the plurality of sub-code blocks to the memory, wherein the plurality of sub-code blocks are written sequentially.

5. The data storage controller of claim 1, wherein the plurality of sub-code blocks are a plurality of tiles that are part of a Spatially-Coupled Low Density Parity Check (SC-LDPC) structure.

6. The data storage controller of claim 5, wherein the electronic processor, when executing the FTL, is further configured to:
    write, after allocating the parity bits to each tile of the plurality of tiles, a first tile of the plurality of tiles to the memory, and
    write, after writing the first tile of the plurality of tiles to the memory, a last tile of the plurality of tiles to the memory.

7. The data storage controller of claim 5, wherein the electronic processor, when executing the FTL, is further configured to:
    write, after allocating the parity bits to each tile of the plurality of tiles, the plurality of tiles to the memory, wherein the plurality of tiles are written to memory sequentially.

8. The data storage controller of claim 7, wherein the electronic processor, when executing the FTL, is further configured to:
    decode the plurality of tiles from the memory in the order in which the plurality of tiles were written to the memory using a sliding window process.

9. A method comprising:
    receiving, with an electronic processor of a data storage controller, data to be stored in a key-value (KV) database;
    separating the data into a plurality of sub-code blocks; and
    allocating parity bits to each sub-code block of the plurality of sub-code blocks.

10. The method of claim 9, wherein the parity bits are asymmetrically allocated to each sub-code block of the plurality of sub-code blocks.

11. The method of claim 10, wherein a first sub-code block of the plurality of sub-code blocks receives more parity bits than a last sub-code block of the plurality of sub-code blocks.

12. The method of claim 9, further comprising:
    writing, after allocating the parity bits to each sub-code block of the plurality of sub-code blocks, the plurality of sub-code blocks to the key-value (KV) database.

13. The method of claim 9, wherein the plurality of sub-code blocks are a plurality of tiles that are part of a Spatially-Coupled Low Density Parity Check (SC-LDPC) structure.

14. The method of claim 13, wherein writing the sub-code blocks to the KV database includes:
    writing a first tile of the plurality of tiles to the KV database, and writing, after writing the first tile of the plurality of tiles to the KV database, a last tile of the plurality of tiles to the KV database.

15. The method of claim 14, further comprising:
decoding the plurality of tiles from the KV database in the order in which the plurality of tiles were written to the KV database, wherein the plurality of tiles are decoded using a sliding window process.

16. A memory device that supports storing data in a key value namespace, the memory device comprising:
a memory including a key-value (KV) database; and
a controller configured to:
perform a first Error Correction Code (ECC) coding process that allocates parity into first user data when writing the first user data to the KV database; and
perform a second ECC coding process that allocates parity into second user data when writing the second user data to a second KV database located within an external electronic device.

17. The memory device of claim 16, wherein the first ECC coding process asymmetrically allocates the parity into the user data, and wherein the first ECC coding process allocates a greater number of parity bits at the beginning of the user data than at the end of the user data.

18. The memory device of claim 16, wherein, to perform the first ECC coding process that allocates the parity into the user data when writing the user data to the KV database, the controller is further configured to:
separate the user data into a plurality of tiles of a Spatially-Coupled Low Density Parity Check (SC-LDPC) structure, and
asymmetrically allocate parity to the plurality of tiles.

19. The memory device of claim 18, wherein, to perform the first ECC coding process that allocates the parity into the user data when writing the user data to the KV database, the controller is further configured to:
write a first tile of the plurality of tiles to the KV database, and
write, after writing the first tile to the KV database, a last tile of the plurality of tiles to the KV database.

* * * * *